(12) United States Patent
Huang et al.

(10) Patent No.: US 11,656,500 B2
(45) Date of Patent: May 23, 2023

(54) SWITCHABLE MULTILAYER CHOLESTERIC LIQUID CRYSTAL REFLECTIVE POLARIZER

(71) Applicant: META PLATFORMS TECHNOLOGIES, LLC, Menlo Park, CA (US)

(72) Inventors: Yuge Huang, Redmond, WA (US); Fenglin Peng, Redmond, WA (US); Lu Lu, Kirkland, WA (US); Junren Wang, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/898,091

(22) Filed: Jun. 10, 2020

(65) Prior Publication Data

US 2021/0389621 A1 Dec. 16, 2021

(51) Int. Cl.
*G02F 1/13357* (2006.01)
*G02F 1/1335* (2006.01)
*G02B 5/30* (2006.01)

(52) U.S. Cl.
CPC ....... *G02F 1/13362* (2013.01); *G02B 5/3016* (2013.01); *G02F 1/133526* (2013.01); *G02F 1/133543* (2021.01); *G02F 2201/343* (2013.01)

(58) Field of Classification Search
None
See application file for complete search history.

(56) References Cited

U.S. PATENT DOCUMENTS

| | | | |
|---|---|---|---|
| 5,627,666 A | 5/1997 | Sharp et al. |
| 5,796,454 A | 8/1998 | Ma |
| 6,147,734 A | 11/2000 | Kashima |
| 10,379,419 B1 | 8/2019 | Lu et al. |
| 10,429,647 B2 | 10/2019 | Gollier et al. |
| 10,429,656 B1 | 10/2019 | Sharma et al. |
| 10,429,657 B1 | 10/2019 | Sharma et al. |
| 10,429,927 B1 | 10/2019 | Sharma et al. |

(Continued)

FOREIGN PATENT DOCUMENTS

CN 104267457 A * 1/2015

OTHER PUBLICATIONS

Facebook Technologies LLC, International Search Report and Written Opinion, PCT/US2018/045808, dated May 7, 2019, 9 pgs.

(Continued)

*Primary Examiner* — Phu Vu
(74) *Attorney, Agent, or Firm* — Morgan, Lewis & Bockius LLP

(57) ABSTRACT

An optical device includes a light source and a polarization selective optical element. The polarization selective optical element includes a stack of a plurality of cholesteric liquid crystal layers. The plurality of cholesteric liquid crystal layers includes a first cholesteric liquid crystal layer with liquid crystal molecules arranged in a first helical configuration having a first pitch range for light of a first wavelength range and a second cholesteric liquid crystal layer with liquid crystal molecules arranged in a second helical configuration having a second pitch range for light of a second wavelength range. The second wavelength range is different from the first wavelength range.

18 Claims, 15 Drawing Sheets

(56) References Cited

U.S. PATENT DOCUMENTS

| | | |
|---|---|---|
| 10,451,885 B2 | 10/2019 | Lu et al. |
| 10,495,798 B1 | 12/2019 | Peng et al. |
| 2002/0030776 A1 | 3/2002 | Khan et al. |
| 2004/0008302 A1 | 1/2004 | Moon |
| 2005/0122583 A1* | 6/2005 | Umeya .................. G03B 21/56 359/449 |
| 2005/0266158 A1* | 12/2005 | Pokorny ............. G02B 5/3016 427/162 |
| 2006/0007550 A1* | 1/2006 | Tonar ..................... B60R 1/088 359/604 |
| 2010/0177113 A1 | 7/2010 | Gay et al. |
| 2012/0062846 A1 | 3/2012 | Dike |
| 2015/0301249 A1 | 10/2015 | Pau et al. |
| 2015/0370074 A1 | 12/2015 | McDowall et al. |
| 2016/0109714 A1 | 4/2016 | Chen |
| 2016/0363770 A1 | 12/2016 | Kim et al. |
| 2016/0377868 A1 | 12/2016 | Ouderkirk et al. |
| 2017/0227777 A1 | 8/2017 | Carollo et al. |
| 2017/0227791 A1 | 8/2017 | von Und Zu Liechtenstein |
| 2017/0242258 A1 | 8/2017 | Edwards |
| 2017/0312614 A1* | 11/2017 | Tran ......................... G06F 3/00 |
| 2018/0063508 A1 | 3/2018 | Traeil et al. |
| 2018/0101020 A1* | 4/2018 | Gollier ................. G02B 27/022 |
| 2019/0243147 A1 | 8/2019 | Smithwick et al. |
| 2019/0353906 A1 | 11/2019 | Gollier et al. |
| 2019/0377184 A1 | 12/2019 | Sharp et al. |
| 2019/0384070 A1 | 12/2019 | Geng et al. |
| 2020/0049872 A1 | 2/2020 | Peng et al. |
| 2020/0049992 A1* | 2/2020 | Peng ...................... G06F 3/012 |

OTHER PUBLICATIONS

Facebook Technologies LLC, International Preliminary Report on Patentability, PCT/US2018/045808, dated Feb. 9, 2021, 7 pgs.

Facebook Technologies LLC, International Search Report and Written Opinion, PCT/US2018/045811, dated Apr. 30, 2019, 9 pgs.

Facebook Technologies LLC, International Preliminary Report on Patentability, PCT/US2018/045811, dated Feb. 9, 2021, 7 pgs.

Peng, Notice of Allowance, U.S. Appl. No. 16/057,686, dated Jul. 25, 2019, 13 pgs.

Peng, Office Action, U.S. Appl. No. 16/057,692, dated Jul. 22, 2019, 14 pgs.

Peng, Notice of Allowance, U.S. Appl. No. 16/057,692, dated Jan. 8, 2020, 9 pgs.

International Search Report and Written Opinion for International Application No. PCT/US2021/031462, dated Feb. 2, 2022, 11 pages.

International Preliminary Report on Patentability for International Application No. PCT/US2021/031462, dated Dec. 22, 2022, 10 pages.

* cited by examiner

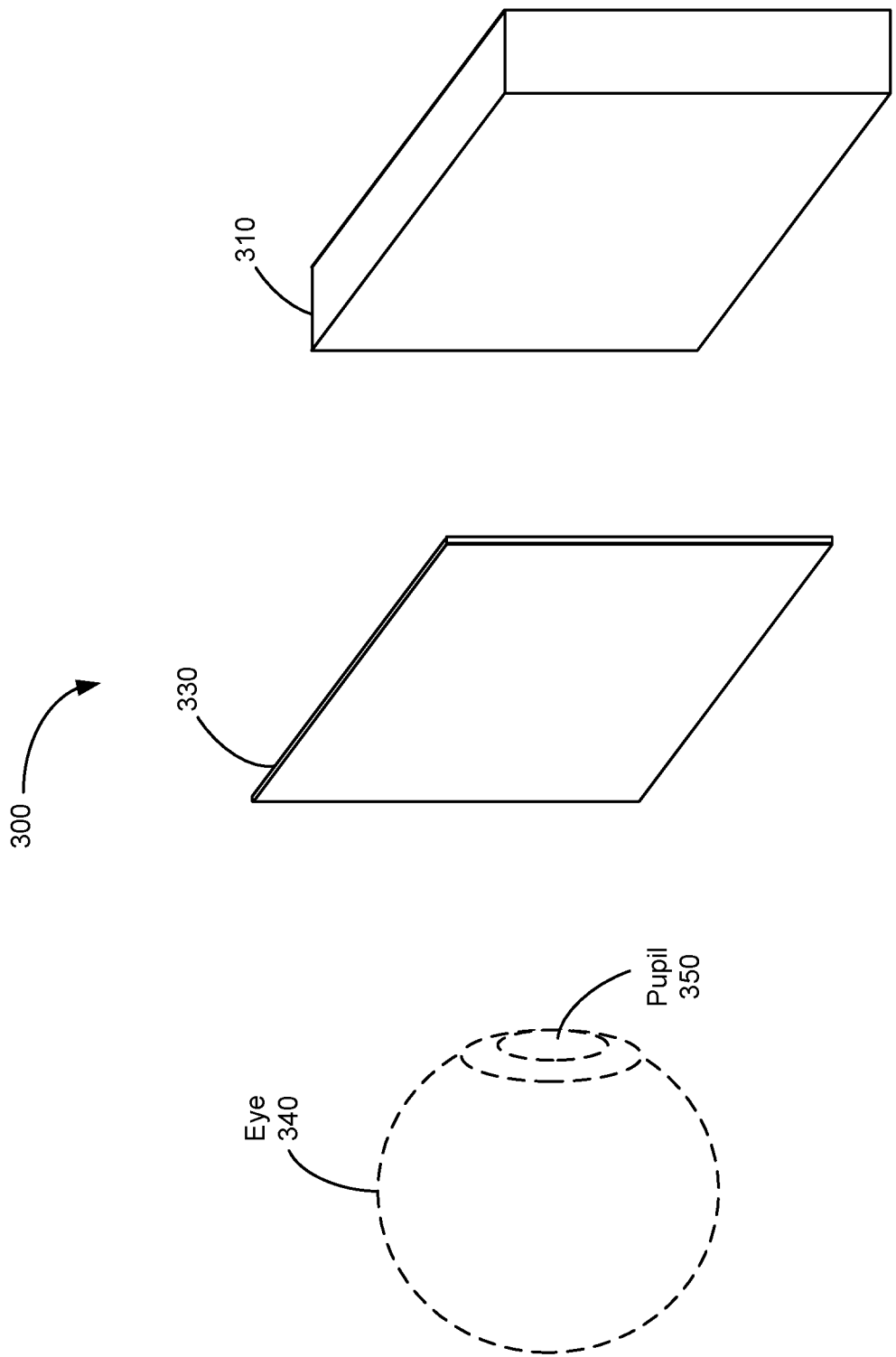

SWITCHABLE MULTILAYER CHOLESTERIC LIQUID CRYSTAL REFLECTIVE POLARIZER

RELATED APPLICATIONS

This application is related to U.S. patent application Ser. No. 16/057,686, filed Aug. 7, 2018, entitled "Switchable Reflective Circular Polarizer in HMD," and U.S. patent application Ser. No. 16/057,692, filed Aug. 7, 2018, entitled "Reflective Circular Polarizer for HMD," both of which are incorporated by reference herein in their entireties.

TECHNICAL FIELD

This relates generally to reflective polarizers, and more specifically to switchable reflective polarizers used in display devices.

BACKGROUND

Head-mounted display devices (also called herein head-mounted displays) are gaining popularity as means for providing visual information to a user. For example, the head-mounted display devices are used for virtual reality and augmented reality operations.

Head-mounted display devices with a wide field of view are desired for improved user experience, but the compact sizes of head-mounted display devices often limit the field of view.

SUMMARY

Accordingly, there is a need for head-mounted display devices capable of rendering images with an increased field of view to enhance users' overall experience with virtual reality and/or augmented reality environment. In addition, the head-mounted display devices should be light-weight and compact.

The above deficiencies and other problems associated with conventional head-mounted displays are reduced or eliminated by the disclosed optical devices and methods.

In accordance with some embodiments, an optical device includes a light source and a polarization selective optical element. The polarization selective optical element includes a stack of a plurality of cholesteric liquid crystal layers. The plurality of cholesteric liquid crystal layers includes a first cholesteric liquid crystal layer with liquid crystal molecules arranged in a first helical configuration having a first pitch range for light of a first wavelength range and a second cholesteric liquid crystal layer with liquid crystal molecules arranged in a second helical configuration having a second pitch range for light of a second wavelength range. The second wavelength range is different from the first wavelength range.

In accordance with some embodiments, a method includes receiving light including a first wavelength and a second wavelength. The method also includes transmitting the light through a polarization selective optical element including a stack of a plurality of cholesteric liquid crystal layers. The plurality of cholesteric liquid crystal layers includes a first cholesteric liquid crystal layer with liquid crystal molecules arranged in a first helical configuration having a first pitch range for light of the first wavelength range including the first wavelength and a second cholesteric liquid crystal layer with liquid crystal molecules arranged in a second helical configuration having a second pitch range for light of a second wavelength range that is different from the first wavelength range and including the second wavelength. Transmitting includes transmitting the light through the first cholesteric liquid crystal layer prior to transmitting the light through the second cholesteric liquid crystal layer.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

Figure 1:
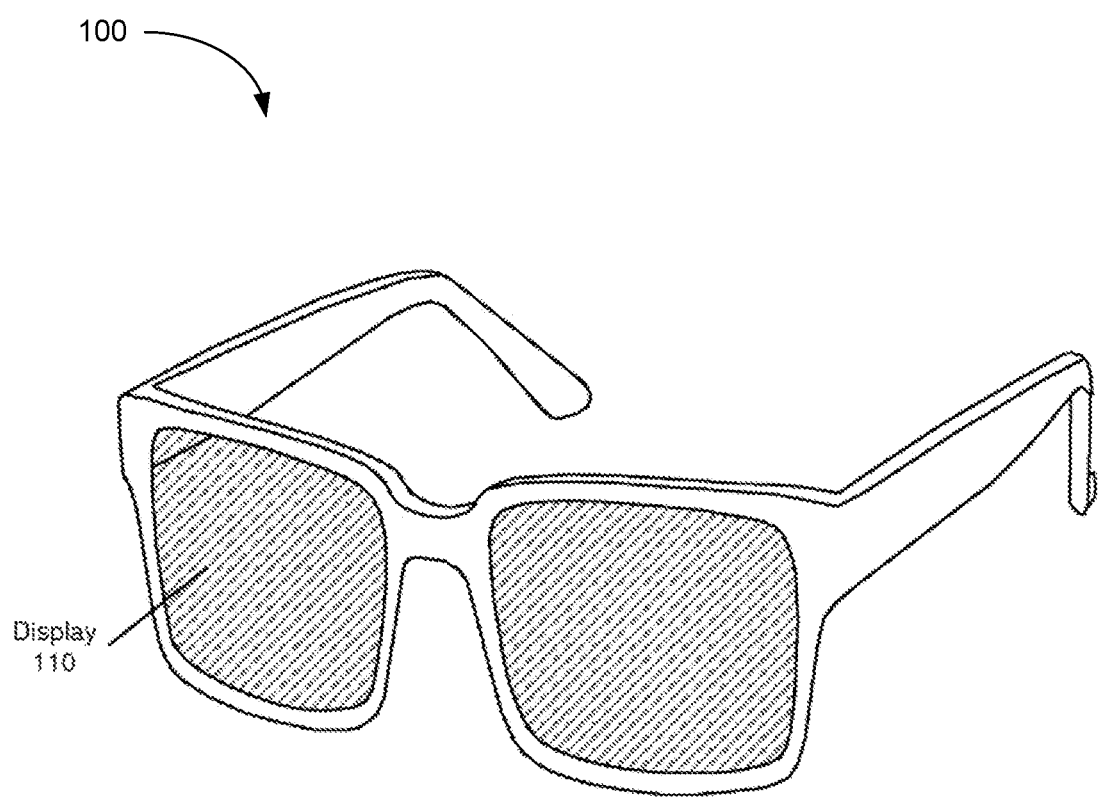
FIG. 1 is a perspective view of a display device in accordance with some embodiments.

These figures are not drawn to scale unless indicated otherwise.

DETAILED DESCRIPTION

There is a need for light-weight and compact-sized optical devices applicable for near-eye displays of head-mounted display devices. The disclosed embodiments provide for a polarization selective optical elements and folded optical systems (e.g., pancake lenses) including such polarization selective optical elements. The polarization selective optical element includes a stack of cholesteric liquid crystal (CLC) layers. A CLC layer selectively interacts with incident light based on polarization, wavelength and/or incident angle of the light. For example, a liquid crystal layer may redirect incident light having a first polarization and a first wavelength range while transmitting light having a polarization distinct from the first polarization and/or light having a wavelength distinct from the first wavelength range. Such polarization selective optical element may be used in place of a combination of a reflective polarizer and a waveplate in a folded optical system.

In some instances, the liquid crystal layers are switchable between a state where liquid crystals are in helical configurations and a state where the liquid crystals are linearly aligned. Such switchable polarization selective optical element may be used for changing a focal length of a folded optical system.

It will also be understood that, although the terms first, second, etc. are, in some instances, used herein to describe various elements, these elements should not be limited by these terms. These terms are used only to distinguish one element from another. For example, a first layer could be termed a second layer, and, similarly, a second layer could be termed a first layer, without departing from the scope of the various described embodiments. The first layer and the second layer are both layers, but they are not the same layer.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
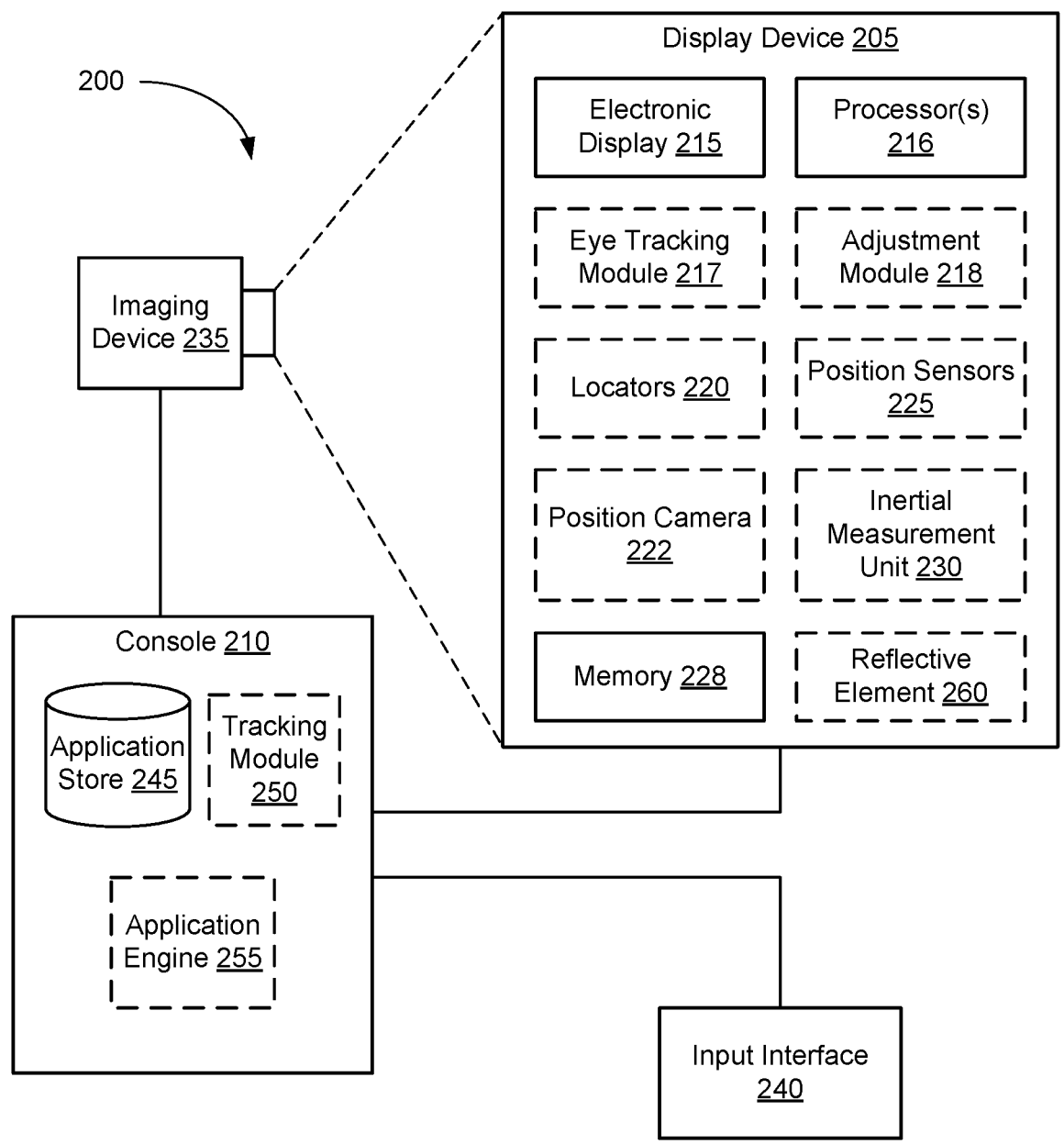
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 (e.g., a light emission device array) and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

Figure 4A:
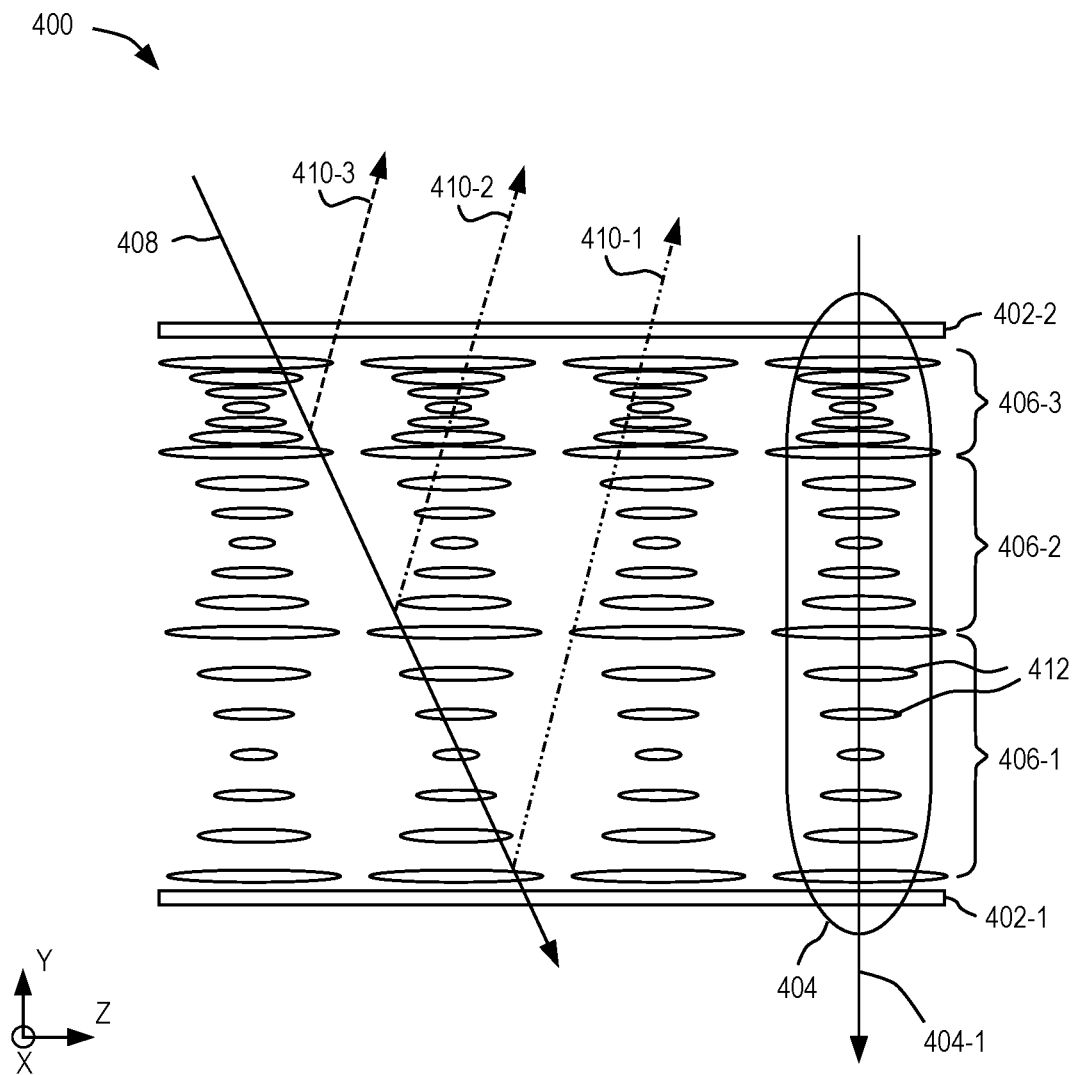
FIGS. 4A-4C are schematic diagrams illustrating a layer of liquid crystals in accordance with some embodiments.
Figure 4B:
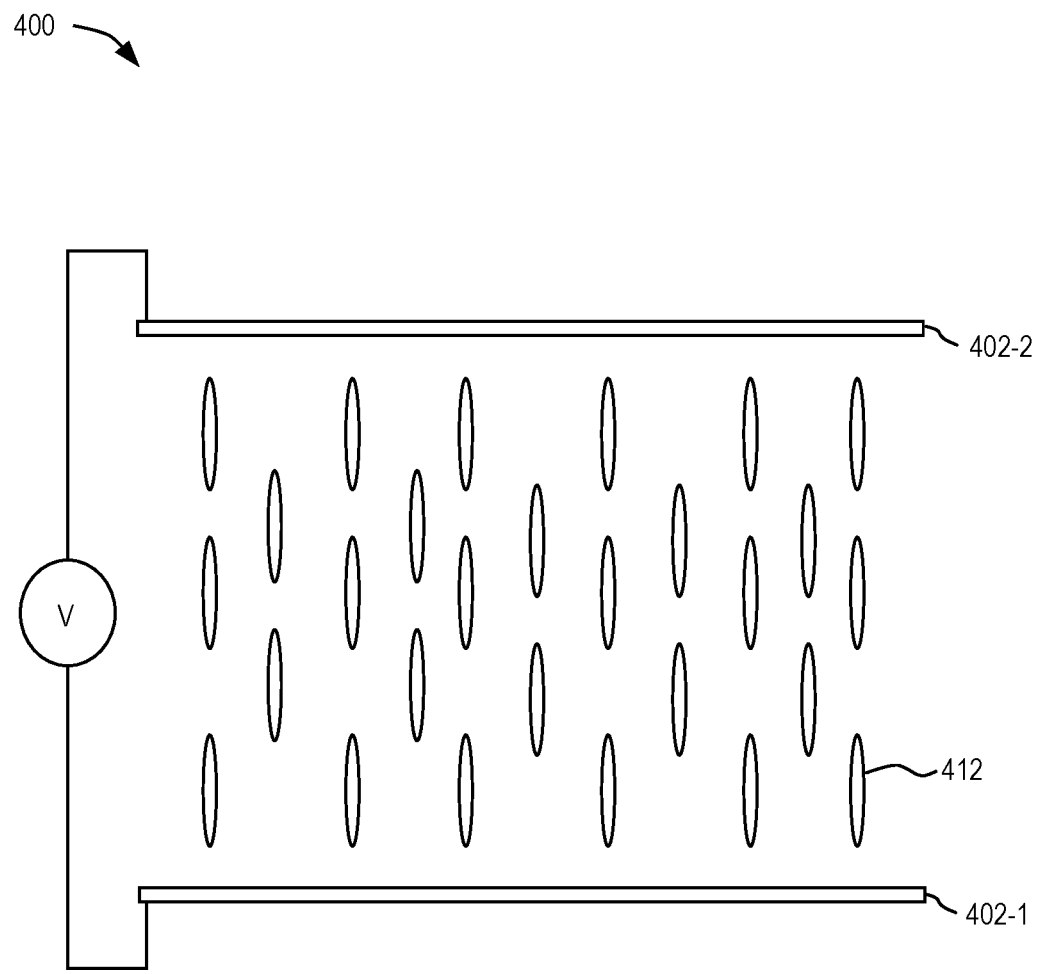
Figure 4C:
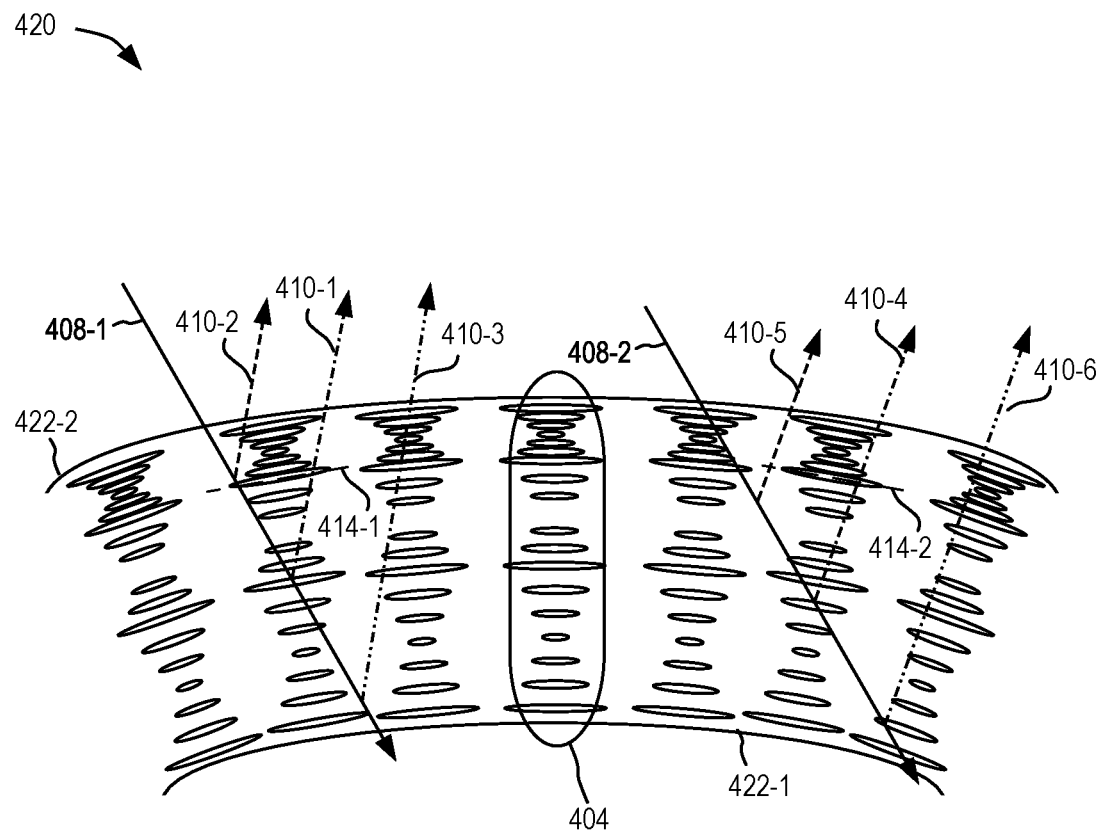

FIGS. 4A-4C are schematic diagrams illustrating liquid crystal layer 400 in accordance with some embodiments. In FIG. 4A, liquid crystal layer 400 includes liquid crystals 412 arranged in helical configurations 404 (e.g., cholesteric liquid crystals). Helical configurations 404 have a helical axis perpendicular to a surface of liquid crystal layer 400 (e.g., surfaces defined by substrates 402-1 and 402-2).

A helical configuration has a pitch (e.g., periodicity) defined as a distance along its helical axis (e.g., axis 404-1) at which an azimuth angle of a helical liquid crystal has rotated 360 degrees. As used herein, a half-pitch refers to one half of a pitch, the half-pitch corresponding to a distance along its helical axis at which an azimuth angle of a helical liquid crystal has rotated 180 degrees. In FIG. 4A, helical configurations 404 have a plurality of portions with different pitches including half-pitches 406-1, 406-2, and 406-3, where half-pitch 406-1 is greater than half-pitch 406-2 and half-pitch 406-2 is greater than half-pitch 406-3 (e.g., helical configurations 404 have a first portion with the first half-pitch 406-1, a second portion with the second half-pitch 406-2, and a third portion with the third half-pitch 406-3). In some embodiments, the pitch varies gradually. In some embodiments, the pitch remains constant between substrates 402-1 and 402-2. In some embodiments, different pitches of the helical configurations are achieved by controlling a concentration and/or a type of a chiral dopant used for forming the helical configurations. In some embodiments, a pitch of the helical configuration determines the wavelength selectivity of a liquid crystal layer. In some embodiments, a liquid crystal layer having a varying pitch (the liquid crystal layer has a range of pitches) is used to reflect light of a broad wavelength range (e.g., a broadband reflective polarizer) so that the first region of liquid crystal layer 400 corresponding to half-pitch 406-1 reflects a first wavelength range, the second region of liquid crystal layer 400 corresponding to half-pitch 406-2 reflects a second wavelength range, and the third region of liquid crystal layer 400 corresponding to half-pitch 406-3 reflects a third wavelength range. In some embodiments, the first wavelength range corresponds to red color (e.g., 635-700 nm), the second wavelength range corresponds to green color (e.g., 495-570 nm), and the third wavelength range corresponds to blue color (e.g., 450-490 nm) such that liquid crystal layer 400 reflects a broad wavelength range (e.g., a wavelength range from 450 nm to 700 nm). In some embodiments, a broad wavelength range corresponds to a bandwidth (e.g., a full-width at half-maximum) of 150 nm or more (e.g., 200 nm, 250 nm, 300 nm, 350 nm, 400 nm, etc.). A liquid crystal layer having a constant pitch is configured to reflect light at a narrow wavelength range (e.g., a narrowband reflective polarizer). In some embodiments, a narrow wavelength range corresponds to a bandwidth (e.g., a full-width at half-maximum) of 100 nm or less (e.g., 50 nm, 30 nm, 20 nm, 10 nm, 5 nm, or 1 nm or less). For example, liquid crystal layer 400 having a constant pitch selective for green color is configured to redirect light between 495 nm and 570 nm. Although FIGS. 4A and 4C show liquid crystal layer 400 having three portions with different pitches, the liquid crystal layer 400 may have fewer or more portions with different pitches (e.g., two, three, four, five, six, or more portions, where each portion has ten or fewer pitches, or 20, 30, 40, 50, 60, 70, 80, or 90 pitches, or any number of portions between the aforementioned numbers of pitches). In some embodiments, liquid crystal layer 400 includes one or more portions characterized by a range of gradient pitches (e.g., a portion in which the pitch varies gradiently along the helical axis). For example, each (or any one or two) of three portions of liquid crystal layer 400 may have a range of pitches instead of a constant pitch. In some embodiments, liquid crystal layer 400 is configured to reflect light having any wavelength within a continuous wavelength range (e.g., an entire spectrum between 450 nm to 650 nm). In some embodiments, liquid crystal layer 400 is configured to reflect light having a wavelength within two or more discrete wavelength ranges (e.g., liquid crystal layer 400 includes multiple regions, each region configured to reflect a respective discrete wavelength range). For example, liquid crystal layer 400 may include a first region configured to reflect 430-470 nm and a second region configured to reflect 630-670 nm, allowing a substantial portion of light having wavelength between 470-630 nm to pass the liquid crystal layer 400.

In some embodiments, the helical configurations define a plurality of reflection planes extending across liquid crystal layer 400. The reflection planes diffract respective portions of incident light 408 received by liquid crystal layer 400. For example, a first region of liquid crystal layer 400 corresponding to half-pitch 406-1 diffracts a first portion of incident light 408 (e.g., light 410-1 corresponding to the first wavelength), a second region of liquid crystal layer 400 corresponding to half-pitch 406-2 diffracts a second portion of incident light 408 (e.g., light 410-2 corresponding to the second wavelength range), and a third region of liquid crystal layer 400 corresponding to half-pitch 406-3 diffracts a third portion of incident light 408 (e.g., light 410-3 corresponding to the third wavelength range). In FIG. 4A, the first portion of incident light 408, the second portion of incident light 408, and the third portion of incident light 408 are diffracted into a same direction. In some other embodiments, the first portion of incident light 408, the second portion of incident light 408, and the third portion of incident light 408 are diffracted into distinct directions.

A cholesteric liquid crystal (CLC) layer, such as liquid crystal layer 400 in FIG. 4A, operates as a reflective polarizer and is selective with respect to handedness, an incident angle, and/or a wavelength range of light incident thereon. For example, for a CLC layer configured to diffract a circularly polarized light with a predefined handedness (and within a predefined incident angle range and within a predefined wavelength range), when a circularly polarized light having the predefined handedness (and an incident angle within the predefined incident angle and a wavelength within the predefined wavelength range) impinges on the CLC layer, the CLC layer diffracts the circularly polarized light (without diffracting an orthogonally polarized light). While reflectively diffracting the direction of the light, the CLC layer maintains the polarization of the reflectively diffracted light (e.g., a left-handed light is reflectively diffracted as the left-handed light). In comparison, the CLC layer forgoes diffracting light that does not have the predefined handedness (and does not have an incident angle within the predefined incident angle or does not have a wavelength within the predefined wavelength range). For example, a CLC layer configured to reflectively diffract a right-handed circularly polarized (RCP) light redirects the RCP light without changing its polarization while transmitting a left-handed circularly polarized (LCP) light without changing its polarization or direction (e.g., a CLC layer may reflectively diffract light having a first circular polarization and a first wavelength range and transmit light having a polarization distinct from the first circular polarization and/or light having a wavelength distinct from the first wavelength range). The CLC may be wavelength-dependent. Thus, if an incident light with the predefined handedness (e.g., RCP) and an incident angle within the predefined incident angle range has a wavelength corresponding to a predefined wavelength range, the CLC layer reflectively diffracts the RCP light while maintaining its polarization. In comparison, an incident light (with or without the predefined handedness (e.g., RCP) and with an incident angle within the predefined incident angle range) having a wavelength outside the predefined wavelength range is transmitted through the CLC layer without redirection while maintaining its polarization. The CLC may be specific to the incident angle. Thus, if an incident light with the predefined handedness (e.g., RCP) and a wavelength within the predefined wavelength range has an incident angle within the designed incident angle range, the CLC layer redirects the RCP light without converting the polarization of the redirected light. In comparison, an incident light (with or without the predefined handedness (e.g., RCP) and a wavelength within the predefined wavelength range) having an incident angle outside the designed incident angle range is transmitted through the CLC layer without redirection while maintaining its polarization.

Liquid crystals 412 are disposed between substrates 402-1 and 402-1. At least one of substrates 402-1 and 402-2 is made of an optically transparent substrate (e.g., glass or plastic). In some embodiments, substrates 402-1 and 402-2 include one or more thin films such as conducting thin films (e.g., indium tin oxide (ITO)) or anti-reflection coatings. Conducting thin films may be used for applying a voltage across at least a portion of liquid crystal layer 400 to change the configuration of the liquid crystals. In some embodiments, liquid crystal layer 400 is switchable between different states by turning the applied voltage on and off. For example, while in a first state, the applied voltage is turned off and liquid crystal layer 400 includes helical configurations 404 shown in FIG. 4A. In the first state, liquid crystal layer 400 causes diffraction for light having a matching polarization handedness. In a second state, a voltage is applied across liquid crystal layer 400 and liquid crystals having a rod-like shape are aligned linearly along with the applied voltage, as shown in FIG. 4B. For example, in the second state, liquid crystal layer 400 includes liquid crystals 412 in a homeotropic configuration. In a homeotropic configuration, liquid crystals 412 having the rod-like shape align perpendicular to a substrate supporting the respective liquid crystal layer (e.g., substrates 402-1 and 402-2). In the second state illustrated in FIG. 4B, liquid crystal layer 400 ceases to cause diffraction and instead transmits light without changing its polarization or direction, regardless of polarization, incident angle or wavelength of the light.

FIG. 4C is a schematic diagram illustrating liquid crystal layer 420 in accordance with some embodiments. Liquid crystal layer 420 is similar to liquid crystal layer 400 described above with respect to FIGS. 4A and 4B, except that liquid crystal layer 420 is disposed on a non-flat surface (e.g., curved surface 422-1). In some embodiments, curved surface 422-1 is a convex, spherical, or aspherical surface of a lens. As shown in FIG. 4C, liquid crystal layer 420 is disposed between curved surface 422-1 and curved surface 422-2 having a curvature corresponding to a curvature of curved surface 422-1. Directions of light 410-1, 410-2, and 410-3 redirected by the reflection planes of liquid crystal layer 420 change across liquid crystal layer 420 in accordance with a curvature of curved surface 422-1 so that light 410-1, 410-2, and 410-3 are redirected to distinct directions (e.g., light 408-1 impinging on a first portion of liquid crystal layer 420 having a first reflection plane 414-1 is directed into a first direction (or a first group of directions) corresponding to light 410-1, 410-2, and 410-3, and light 408-2 impinging on a second portion of liquid crystal layer 420 having a second reflection plane 414-2 non-parallel to the first reflection plane 414-1 is directed into a second direction (or a second group of directions), different from the first direction, corresponding to light 410-4, 410-5, and 410-6).

Figure 5A:
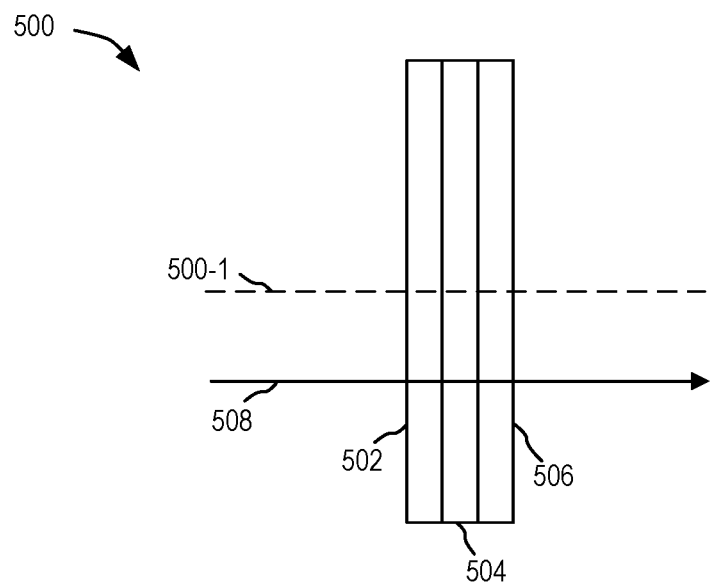
FIGS. 5A-5C are schematic diagrams illustrating a polarization selective optical element in accordance with some embodiments.
Figure 5B:
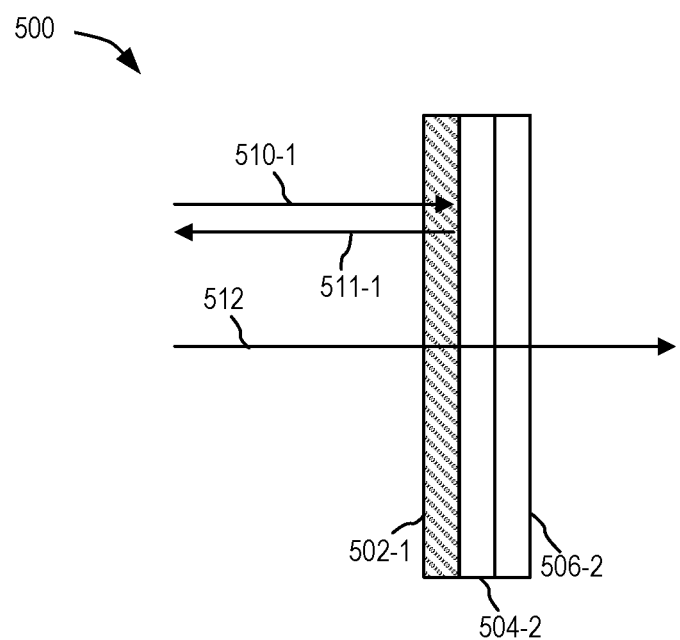
Figure 5C:
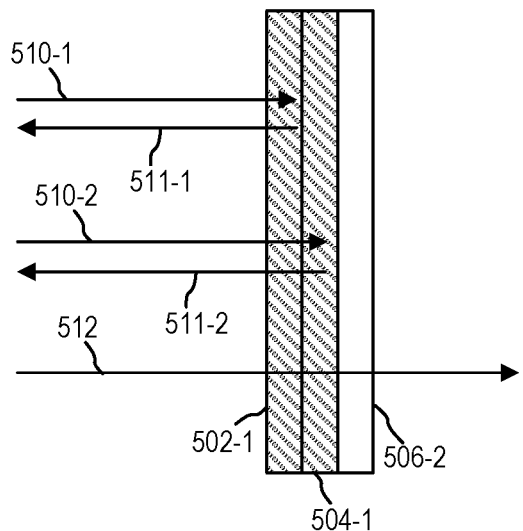

FIGS. 5A-5C are schematic diagrams illustrating polarization selective optical element 500 in accordance with some embodiments. Polarization selective optical element 500 includes a stack of liquid crystal layers including three or more liquid crystal layers (e.g., liquid crystal layers 502, 504, and 506). In some embodiments, liquid crystal layers 502, 504, and 506 collectively correspond to liquid crystal layer 400 described above with respect to FIGS. 4A-4B. In some embodiments, liquid crystal layers 502, 504, and 506 are positioned relative to one another so that the layers have a common geometric axis (e.g., geometric axis 500-1 passing through geometric centers of liquid crystal layers 502, 504, and 506). In some embodiments, liquid crystal layers 502, 504, and 506 are positioned in such a way that the adjacent layers are in direct contact with each other (e.g., each of liquid crystal layers 502, 504, and 506 is in contact with at least one of the rest of liquid crystal layers 502, 504, and 506). For example, liquid crystal layer 504 has a first surface in direct contact with liquid crystal layer 502 and an opposing second surface in direct contact with liquid crystal layer 506. In some embodiments, liquid crystal layers 502, 504, and 506 are positioned in such a way that at least two of the layers are separate from each other (e.g., at least one of the liquid crystal layers 502, 504, and 506 is separate from at least one other of the liquid crystal layers 502, 504, and 506). For example, liquid crystal layer 502 is not in direct contact with liquid crystal layer 506. In some embodiments, none of liquid crystal layers 502, 504, and 506 are in contact with any other of liquid crystal layers 502, 504, and 506 (e.g., each of liquid crystal layers 502, 504, and 506 is separate from the rest of liquid crystal layers 502, 504, and 506).

In some embodiments, liquid crystal layers 502, 504, and 506 in the first state include cholesteric liquid crystals arranged in helical configurations having a same handedness. For example, the helical configurations in liquid crystal layers 502, 504, and 506 turn around their respective helical axes with a same handedness (e.g., all of the helical configurations in liquid crystal layers 502, 504, and 506 are right-handed, or alternatively, all of the helical configurations in liquid crystal layers 502, 504, and 506 are left-handed). Such configuration of liquid crystal layers 502, 504, and 506 in the first state enable redirecting (e.g., reflect, deflect, or diffract) light having the same handedness, while allowing light having a different (e.g., orthogonal) handedness to transmit through liquid crystal layers 502, 504, and 506 without redirection.

In some embodiments, liquid crystal layers 502, 504, and 506 in the first state include cholesteric liquid crystals having distinct pitches or distinct pitch ranges. For example, liquid crystal layer 502 includes liquid crystals arranged in a first helical configuration having a first pitch, liquid crystal layer 504 includes liquid crystals arranged in a second helical configuration having a second pitch, and liquid crystal layer 506 includes liquid crystals arranged in a third helical configuration having a third pitch, where the first pitch, the second pitch, and the third pitch are distinct from one another. Liquid crystal layers 502, 504, and 506 in the first state are therefore configured to redirect light of distinct wavelength ranges (e.g., liquid crystal layer 502 redirects light of a first wavelength that is not redirected by liquid crystal layer 504 or 506, liquid crystal layer 504 redirects light of a second wavelength, different from the first wavelength, that is not redirected by liquid crystal layer 502 or 506, and liquid crystal layer 506 redirects light of a third wavelength, different from the first wavelength and the second wavelength, that is not redirected by liquid crystal layer 502 or 504). For example, liquid crystal layer 502 redirects light having a first wavelength range (and a first polarization), liquid crystal layer 504 redirects light having a second wavelength range (and the first polarization) and liquid crystal layer 506 redirects light having a third wavelength range (and the first polarization), where the first, second, and third wavelength ranges are distinct from each other. In some embodiments, the first wavelength range, the second wavelength range, and the third wavelength range correspond to distinct colors. In some embodiments, each of the liquid crystal layers has a constant pitch corresponding to a narrow bandwidth reflective polarizer, as described above with respect to FIG. 4A.

In some embodiments, liquid crystal layers 502, 504, and 506 are arranged in an order so that liquid crystal layer 502, which is the first layer of the three liquid crystal layers 502, 504, and 506 to receive incident light 508 (e.g., liquid crystal layer 502 having the shortest distance to a light source providing incident light 508), reflects light having a wavelength range corresponding to green color. Consequently, liquid crystal layers 504 and 506 reflect light corresponding to other colors, such as red or blue. In some embodiments, the order of color-selectivity of the layers is either green-red-blue or green-blue-red so that liquid crystal layer 502 having the shortest distance to the light source redirects light of green color (e.g., while transmitting light of any different color, such as blue or red). As explained above, the wavelength selectivity of CLCs is based upon the pitch of CLCs configurations. Therefore, liquid crystal layer 502 reflecting green light includes CLCs having a first pitch range, while a liquid crystal layer reflecting red light includes CLCs having a second pitch range different from the first pitch range and a liquid crystal layer reflecting blue light includes CLCs having a third pitch range different from the first pitch range and the second pitch range. In some embodiments, the first pitch range is greater than the second pitch range, the third pitch range is greater than the first pitch range. In some embodiments, the first pitch range includes a pitch greater than any pitch in the second pitch range. In some embodiments, the first pitch range includes a pitch shorter than any pitch in the third pitch range.

The order (or sequence or relative positioning) of liquid crystal layers 502, 504, and 506 is important in elimination or reduction of "ghost images" formed while light passes through polarization selective optical element 500. In some cases, ghost images include optical artifacts arising from reflection of light off one or more optical surfaces. The problems associated with ghost images are exacerbated when light is reflected off multiple optical surfaces (e.g., in a stack of optical elements, such as liquid crystal layers). Human eyes are generally the most sensitive to green color. Thus, perceived ghost images can be reduced by positioning the layer reflecting the wavelength range corresponding to the green color as the first layer receiving the incident light (e.g., liquid crystal layer 502 is configured to reflect the green wavelength range) so that the light having the green color does not pass through multiple optical surfaces.

In some embodiments, a respective liquid crystal layer of liquid crystal layers 502, 504, and 506 of polarization selective optical element 500 is switchable between different states including the first state and the second state described above with respect to FIGS. 4A and 4B (as a result, polarization selective optical element 500 may be switchable among at least eight different states). The first state corresponds to a state where no voltage is applied (e.g., as shown in FIG. 4A) and the second state corresponds to a state where voltage is applied across a liquid crystal layer (e.g., as shown in FIG. 4B). In some embodiments, liquid crystal layers 502, 504, and 506 are individually and independently switchable between the first state and the second state (e.g., liquid crystal layer 502 may be placed in the first state while liquid crystal layers 504 and 506 are in the second state, liquid crystal layer 504 may be placed in the first state while liquid crystal layers 502 and 506 are in the second state, or liquid crystal layer 506 may be placed in the first state while liquid crystal layers 502 and 504 are in the second state).

As shown in FIG. 5B, liquid crystal layer 502 is in the first state, indicated as liquid crystal layer 502-1, having liquid crystals arranged in helical configurations as explained above with respect to FIG. 4A. Concurrently, liquid crystal layers 504 and 506 are in the second state, indicated as liquid crystal layers 504-2 and 506-2, having liquid crystals in a linear configuration, as explained above with respect to FIG. 4B. In FIG. 5B, liquid crystal layer 502-1 receives incident light 510-1, having the first polarization and the first wavelength range, and redirects (e.g., reflects, deflects, or diffracts) at least a portion of the received light as light 511-1. Incident light 512 having a polarization distinct from (e.g., orthogonal to) the first polarization and/or a wavelength outside the first wavelength range is transmitted through liquid crystal layer 502-1. In addition, incident light 512 is also transmitted through any liquid crystal layers in the second state, such as liquid crystal layers 504-2 and 506-2.

In addition, any two of liquid crystal layers 502, 504, and 506 may be put into the first state, while the remaining liquid crystal layer is in the second state. For example, in FIG. 5C, liquid crystal layer 504 is also switched to the first state, indicated as liquid crystal layer 504-1. Liquid crystal layer 504-1 receives incident light 510-2, having the first polarization and the second wavelength range, and redirects (e.g., reflects) at least a portion of the received light as light 511-2. Incident light 512 having a wavelength outside the first wavelength range and the second wavelength range (and/or a polarization distinct from the first polarization) is transmitted through liquid crystal layers 502-1 and 504-1 in the first state. Consequently, incident light 512 reaches liquid crystal layer 506-2, and is transmitted through liquid crystal layer 506-2 in the second state. In some cases, all three of liquid crystal layers 502, 504, and 506 may be put into the first state.

Figure 5D:
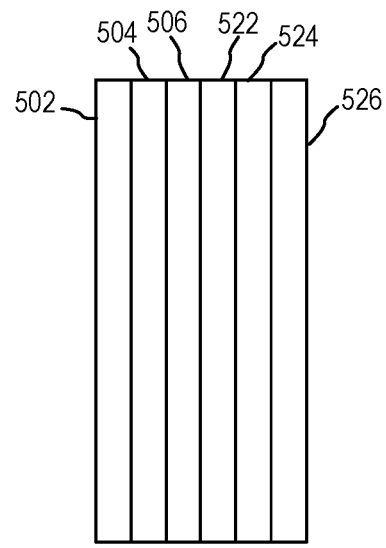
FIG. 5D is a schematic diagram illustrating a polarization selective optical element including six liquid crystal layers.

In some embodiments, a polarization selective optical element includes four, five, or six liquid crystal layers. FIG. 5D is a schematic diagram illustrating polarization selective optical element 520 including six liquid crystal layers (e.g., liquid crystal layers 502, 504, 506, 522, 524, and 526). In some embodiments, each liquid crystal layer of liquid crystal layers 502, 504, 506, 522, 524, and 526 is configured to reflect light within a distinct wavelength range. For example, each of the liquid crystal layers includes cholesteric liquid crystals in helical configurations having a unique pitch, or a range of pitches, so that each of the liquid crystal layers reflects light within a unique wavelength range. In some embodiments, two or more of the liquid crystal layers 502, 504, 506, 522, 524, and 526 are configured to reflect light with a distinct wavelength but corresponding to a same or similar color. For example, liquid crystal layer 502 is configured to reflect light at a first wavelength range corresponding to a first green color and liquid crystal layer 504 is configured to reflect light at a second wavelength range corresponding to a second green color (e.g., the second green color is a different shade of green than the first green color). For example, the first wavelength range may overlap with the second wavelength range, or the first wavelength range is adjacent to the second wavelength range.

Figure 5E:
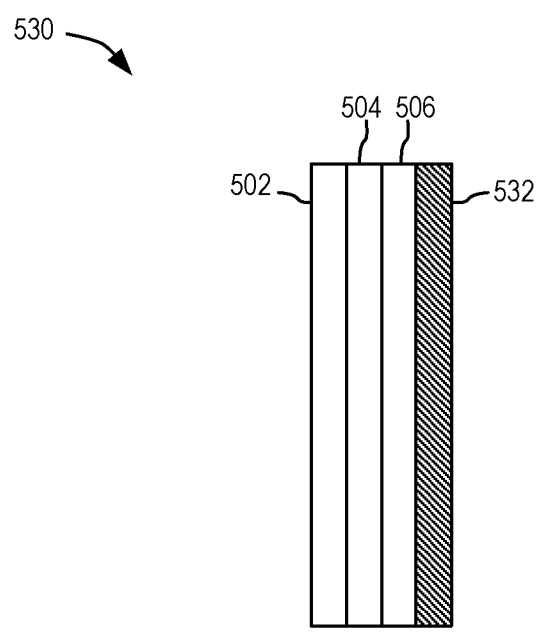
FIG. 5E is a schematic diagram illustrating a polarization selective optical element in accordance with some embodiments.

FIG. 5E is a schematic diagram illustrating polarization selective optical element 530 in accordance with some embodiments. Polarization selective optical element 530 includes one or more liquid crystal layers (e.g., liquid crystal layers 502, 504, and 506 described with respect to FIGS. 5A-5C). Polarization selective optical element 530 further includes reflective polarizer 532 (e.g., a beam splitting polarizer). In some embodiments, reflective polarizer 532 is in direct contact with the one or more liquid crystal layers 502, 504, and 506. For example, reflective polarizer 532 may be in direct contract with liquid crystal layer 506, as shown in FIG. 5E. In some embodiments, reflective polarizer 532 separates incident light into two components propagating in distinct directions based on polarization. For example, a portion of the incident light having a first polarization is reflected while a portion of light having a second polarization is transmitted. In some embodiments, reflective polarizer 532 is a thin film polarizer, a wire-grid polarizer, a birefringent polarizer (e.g., a quartz or a calcite polarizer), or a Fresnel polarizer. Such reflective polarizers do not typically have an incident angle and/or wavelength selectivity as do polarizers based on CLCs. Therefore, the one or more liquid crystal layers including CLCs (e.g., liquid crystal layers 502, 504, and 506) may be combined with reflective polarizer 532 to provide incident angle and/or wavelength selectivity.

Figure 6:
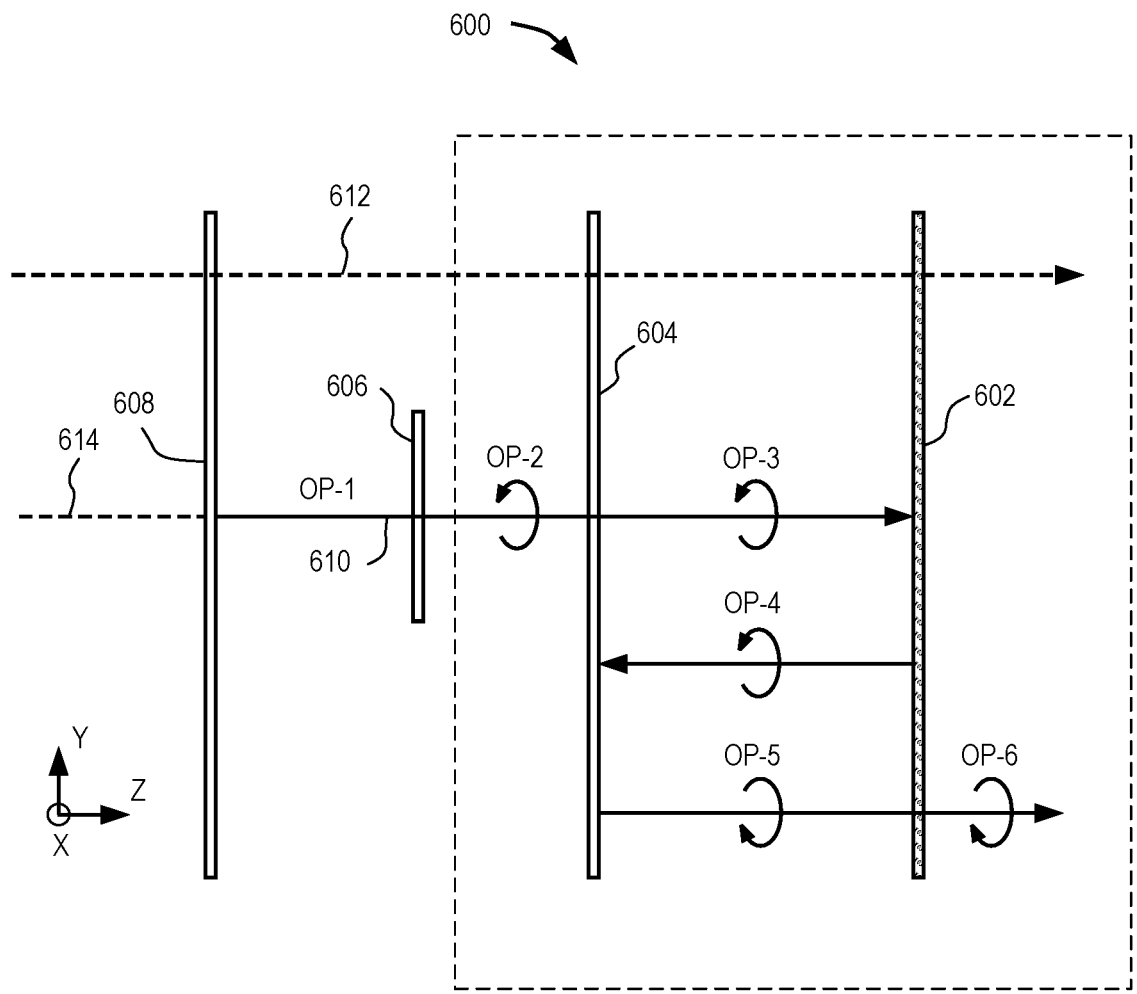
FIG. 6 is a schematic diagram illustrating light propagating through a folded optical system in accordance with some embodiments.

FIG. 6 is a schematic diagram illustrating light propagating through folded optical system 600 in accordance with some embodiments. It is noted that in FIGS. 6, 7A-7C and 8A, polarization of light is annotated with universal annotations that do not take into account a propagation direction of a respective ray (e.g., the right-handed circularly polarized light is annotated with a counter-clockwise arrow regardless of the propagation direction of light, and the left-handed circularly polarized light is annotated with a clockwise arrow regardless of the propagation direction of light). Folded optical system 600 includes polarization selective optical element 602 and partial reflector 604 (e.g., a 50/50 mirror). In some embodiments, folded optical system 600 is a pancake lens with one or both of polarization selective optical element 602 and partial reflector 604 having a curved surface. In some embodiments, polarization selective optical element 602 and/or partial reflector 604 are coupled with a curved surface of one or more lenses (e.g., partial reflector 604 coupled with a curved surface of a lens shown in FIG. 8A). In some embodiments, polarization selective optical element 602 is similar to polarization selective optical element 500 described with respect to FIG. 5A, except that polarization selective optical element 602 is not switchable. Instead, polarization selective optical element 602 includes three or more liquid crystal layers with cholesteric liquid crystals arranged in fixed helical configurations (e.g., as described with respect to FIG. 4A). Polarization selective optical element 602 is configured to redirect light having at least a particular wavelength range or particular wavelength ranges. Partial reflector 604 receives light 610 (e.g., along optical path OP-1) from display 608 (e.g., display 608 corresponding to array of light emitting devices 310 in FIG. 3). In some embodiments, light 610 passes through circular polarizer 606 that converts polarization of light 610 to a first circular polarization (e.g., along optical path OP-2). Partial reflector 604 transmits a portion of light 610 toward polarization selective optical element 602 (e.g., along optical path OP-3) without changing its polarization. Polarization selective optical element 602 receives light 610 from partial reflector 604 and redirects at least a portion of the received light having the first circular polarization and within the particular wavelength range back toward partial reflector 604 (e.g., along optical path OP-4, which may be collinear with optical path OP-3 but is illustrated offset from optical path OP-3 for clarity). The polarization of light 610 is not changed when it is redirected by polarization selective optical element 602 and therefore the light received by partial reflector 604 from polarization selective optical element 602 has the first circular polarization. Partial reflector 604 reflects a portion of the light toward polarization selective optical element 602 (e.g., along optical path OP-5, which may be collinear with optical path OP-4, but is illustrated offset from optical path OP-4 for clarity) such that the polarization of the light changes from the first circular polarization to a second circular polarization orthogonal to the first circular polarization. Polarization selective optical element 602 transmits the light having the second circular polarization (e.g., along optical path OP-6) (e.g., without changing its direction).

In contracts, light 612 having a polarization distinct from (e.g., orthogonal to) the first circular polarization and/or a wavelength outside the particular wavelength range is transmitted at least partially through partial reflector 604 and polarization selective optical element 602 without bouncing between polarization selective optical element 602 and partial reflector 604. In some embodiments, light 612 is output by display 608. In some embodiments, light 612 originates from outside of display 608 (e.g., display 608 is a partially transmitting display configured for providing augmented reality content). For example, light 612 may be ambient light. In some embodiments, a portion of the light originating from outside of display 608, e.g., light 614 having a wavelength in the particular wavelength range, is transmitted through display 608 and continues to propagate through optical system 600 along folded optical paths OP-1 through OP-6.

In some embodiments, polarization selective optical element 602 with CLCs replaces a combination of a reflective polarizer and a waveplate in a conventional folded optical system. Folded optical system 600 may, therefore, have lighter weight than a conventional folded optical system (e.g., a pancake lens including a reflective polarizer and a waveplate). Folded optical systems, such as folded optical system 600, increase an optical path of light projected from a display to an eye of a user. Such folded optical systems thereby provide for an increased field of view without increasing a physical distance between the display and the eye of the user or compromising image quality.

Figure 7A:
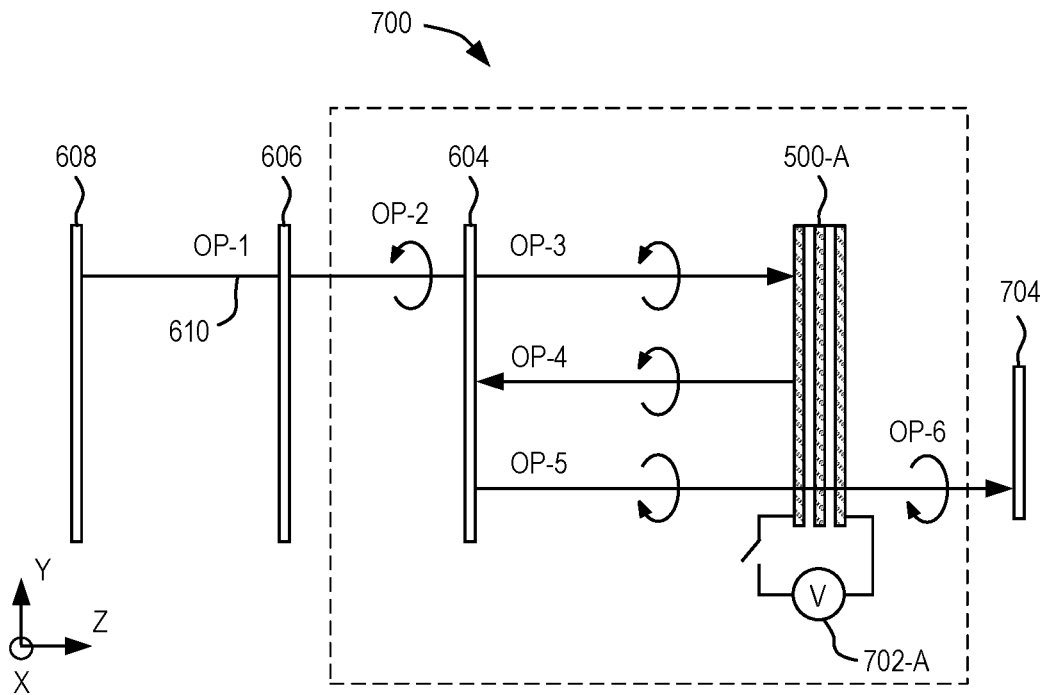
FIGS. 7A-7C are schematic diagrams illustrating light propagating through a folded optical system including the polarization selective optical element of FIG. 5A in accordance with some embodiments.
Figure 7B:
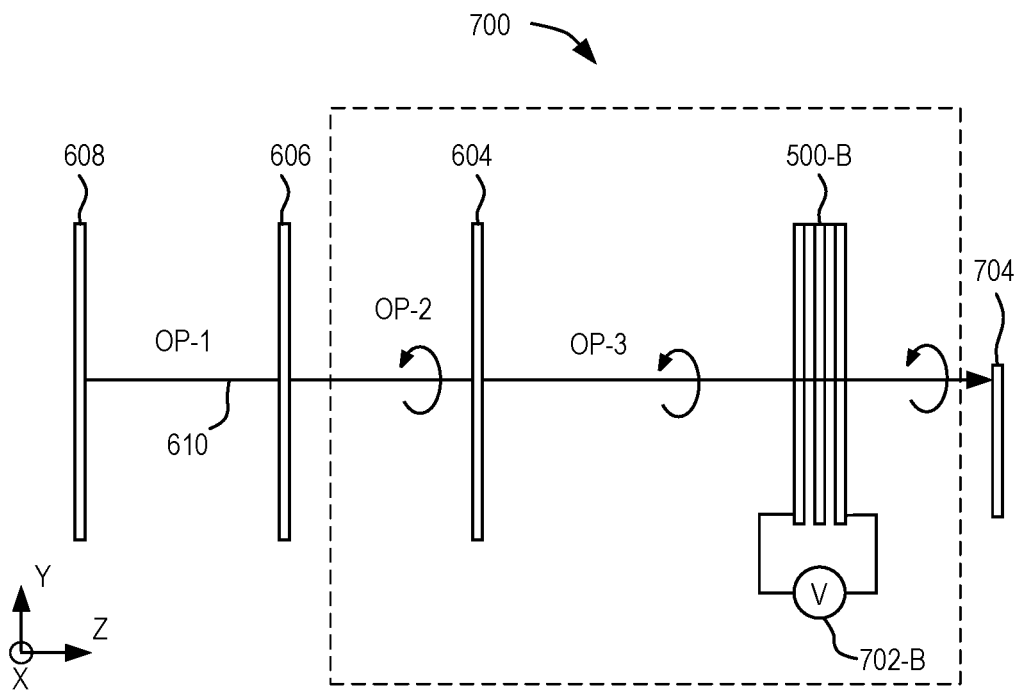
Figure 7C:
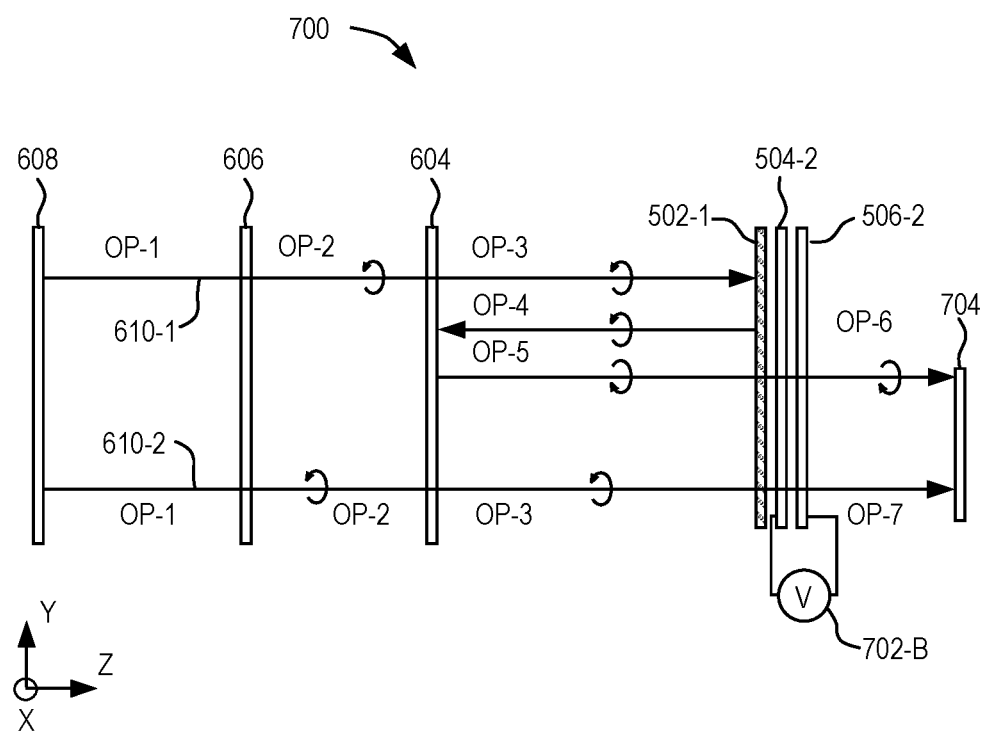

FIGS. 7A-7C are schematic diagrams illustrating light propagating through folded optical system 700 including polarization selective optical element 500 in accordance with some embodiments. In some embodiments, folded optical system 700 is similar to folded optical system 600 described above with respect to FIG. 6, except that folded optical system 700 includes polarization selective optical element 500 with liquid crystal layers switchable between different states, including the first state and the second state, as described above with respect to FIGS. 5A-5C. In some embodiments, folded optical system 700 is disposed between display 608 and eye-box 704 (e.g., eye-box 704 corresponding to a position of an eye of a user of a display device).

In FIG. 7A, liquid crystal layers of polarization selective optical element 500 are in the first state, indicated as polarization selective optical element 500-A, having no voltage applied across polarization selective optical element 500 (e.g., voltage source V is in state 702-A). While the liquid crystal layers are in the first state, light 610 having a wavelength range corresponding to a combination of pitches of helical liquid crystals of polarization selective optical element 500-A propagates through folded optical system 600 along optical path OP-1 through OP-6, as described with respect to FIG. 6.

In FIG. 7B, a voltage is applied across polarization selective optical element 500 (e.g., voltage source V is in state 702-B). Liquid crystal layers of polarization selective optical element 500 are therefore in the second state, indicated as polarization selective optical element 500-B. The liquid crystal layers of polarization selective optical element 500-B in the second state include liquid crystals arranged in a linear (e.g., homeotropic) configuration, as described above with respect to FIG. 4B. As shown, light 610 from display 608 propagates through folded optical system 600 (e.g., along optical paths OP-1, OP-2, and OP-3) without folding.

In FIG. 7C, a voltage is applied across liquid crystal layers 504 and 506 of polarization selective optical element 500 (but not across liquid crystal layer 502) so that liquid crystal layers 504 and 506 are in the second state having liquid crystals in the linear configuration (e.g., indicated as liquid crystal layers 504-2 and 506-2) while liquid crystal layer 502 is in the first state (indicated as liquid crystal layer 502-1). Liquid crystal layers 504-2 and 506-2, therefore, transmit light from display 608 (e.g., light 610-1 and 610-2) regardless of the polarization or wavelength of the light. Liquid crystal layer 502-1 redirects light having a particular wavelength range corresponding to a pitch or a range of pitches of its CLCs so that a portion of light from display 608 (e.g., light 610-1) within the particular wavelength range propagates through folded optical system 700 along optical paths OP-1 through OP-6, as described with respect to FIG. 6. As shown in FIG. 7C, folded optical system 700 having switchable polarization selective optical element 500 guides light through different optical paths depending on properties of the light (e.g., polarization and/or a wavelength range of the light).

Figure 8A:
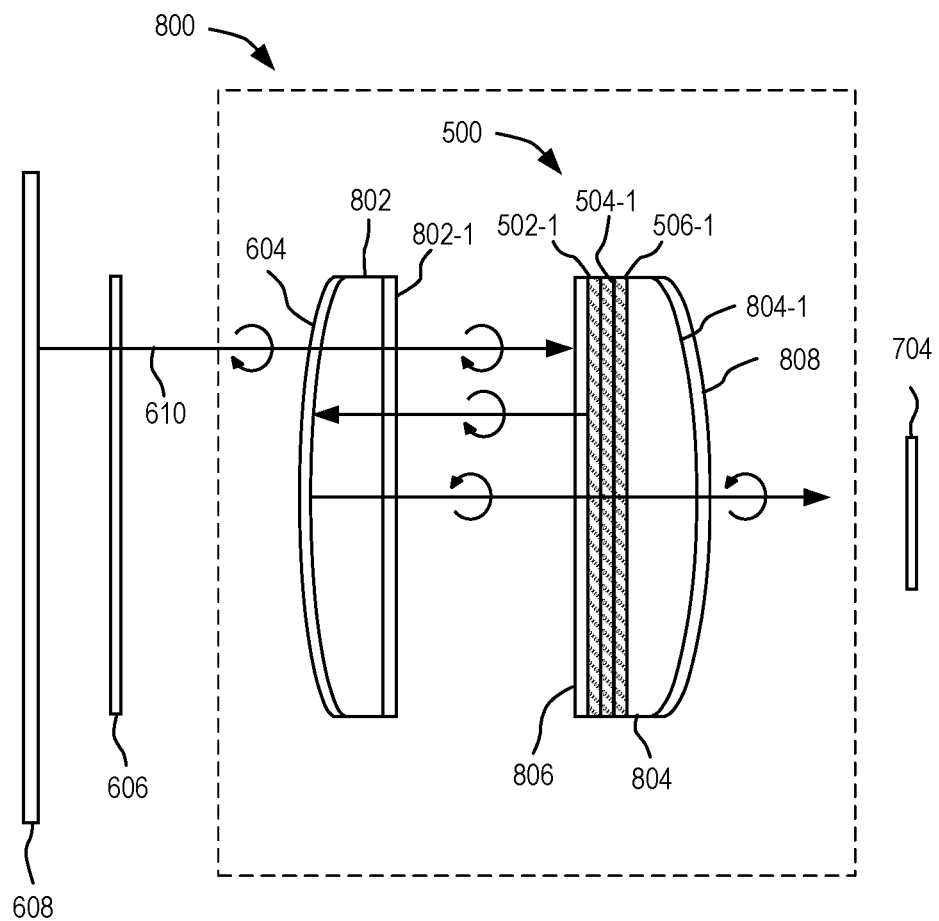
FIG. 8A is a schematic diagram illustrating a pancake lens in accordance with some embodiments.

FIG. 8A is a schematic diagram illustrating pancake lens 800 in accordance with some embodiments. In some embodiments, pancake lens 800 is similar to folded optical system 700 described with respect to FIGS. 7A-7C but further includes one or more lenses (e.g., lenses 802 and 804) having one or more curved surfaces.

In FIG. 8A, pancake lens 800 includes lens 802 coupled with partial reflector 604 and lens 804 coupled with polarization selective optical element 500 including liquid crystal layers 502-1, 504-1, and 506-1 in the first state (e.g., no voltage applied). In some embodiments, partial reflector 604 is in direct contract with a curved surface of lens 802, as shown in FIG. 8A. In some embodiments, lenses 802 and 804 are made of an optically transparent substrate. In some embodiments, each lens includes at least one curved surface. In some embodiments, lenses 802 and 804 include at least one of a convex surface, a concave surface, a spherical surface, or an aspherical surface. In some embodiments, partial reflector 604 is disposed on a convex surface of lens 802 such that partial reflector 604 is facing display 608 (partial reflector 604 is located between display 608 and lens 802), as shown in FIG. 8A. In some embodiments, lens 802 includes an opposing flat surface 802-1 facing polarization selective optical element 500. In some embodiments, polarization selective optical element 500 is disposed on a flat surface of lens 804 facing partial reflector 604 and display 608, as shown in FIG. 8A. In some embodiments, lens 804 includes an opposing convex surface 804-1 facing an eye of a user (e.g., eye-box 704). In some embodiments, polarization selective optical element 500 is disposed on convex surface 804-1 of lens 804 (e.g., CLCs are arranged on a curved surface as described above with respect to FIG. 4C).

In some embodiments, polarization selective optical element 500 is in direct contact with lens 802 as well as lens 804 (e.g., polarization selective optical element 500 is sandwiched between lenses 802 and 804).

In some embodiments, pancake lens 800 includes one or more antireflective coatings. For example, in FIG. 8A, surface 802-1 of lens 802, surface 804-1 of lens 804, and surface 806 of polarization selective optical element 500 include antireflection coatings to reduce optical artifacts arising from reflections at these surfaces (e.g., coating 808 on surface 804-1).

In FIG. 8A, at least one liquid crystal layer of polarization selective optical element 500 is in the first state and light 610 from display 608 passes through circular polarizer 606 and at least a portion of light 610 (e.g., a component of light 610 corresponding to the liquid crystal layer(s) in the first state) propagates through pancake lens 800 along a folded optical path, as described above with respect to FIG. 6.

As explained above with respect to FIG. 5A, in some embodiments the liquid crystal layers (e.g., liquid crystal layers 502-1, 504-1, and 506-1) are ordered so that liquid crystal layer 502 positioned at the shortest distance from display 608 is selective for a green light. Consequently, liquid crystal layers 504 and 506 located further away from display 608 are selective for blue and red light, in either order (e.g., liquid crystal layer 504 is selective for blue light and liquid crystal layer 506 is selective for red light, or vice versa).

Figure 8B:
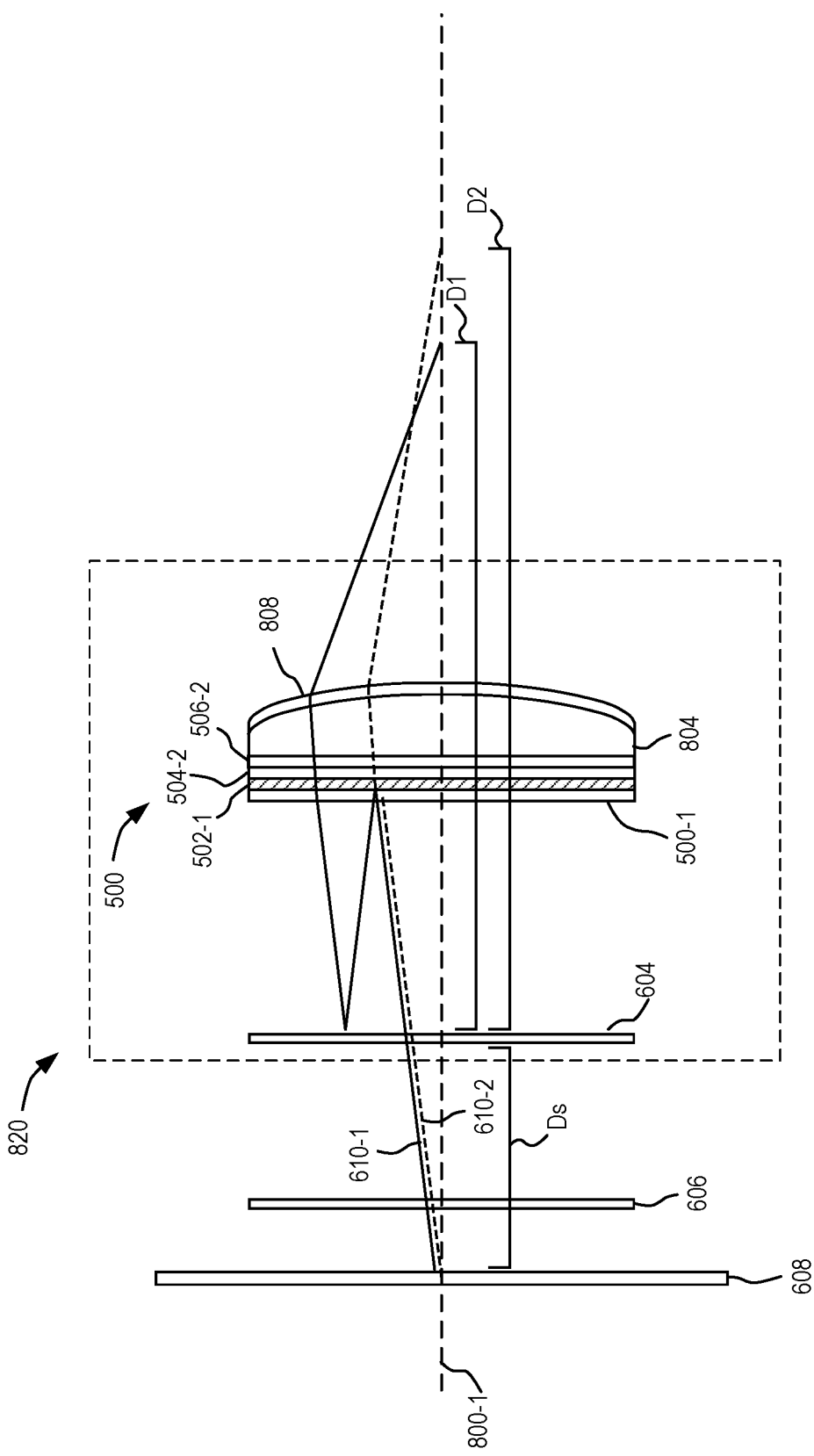
FIGS. 8B and 8C are schematic diagrams illustrating a pancake lens in accordance with some embodiments.
Figure 8C:
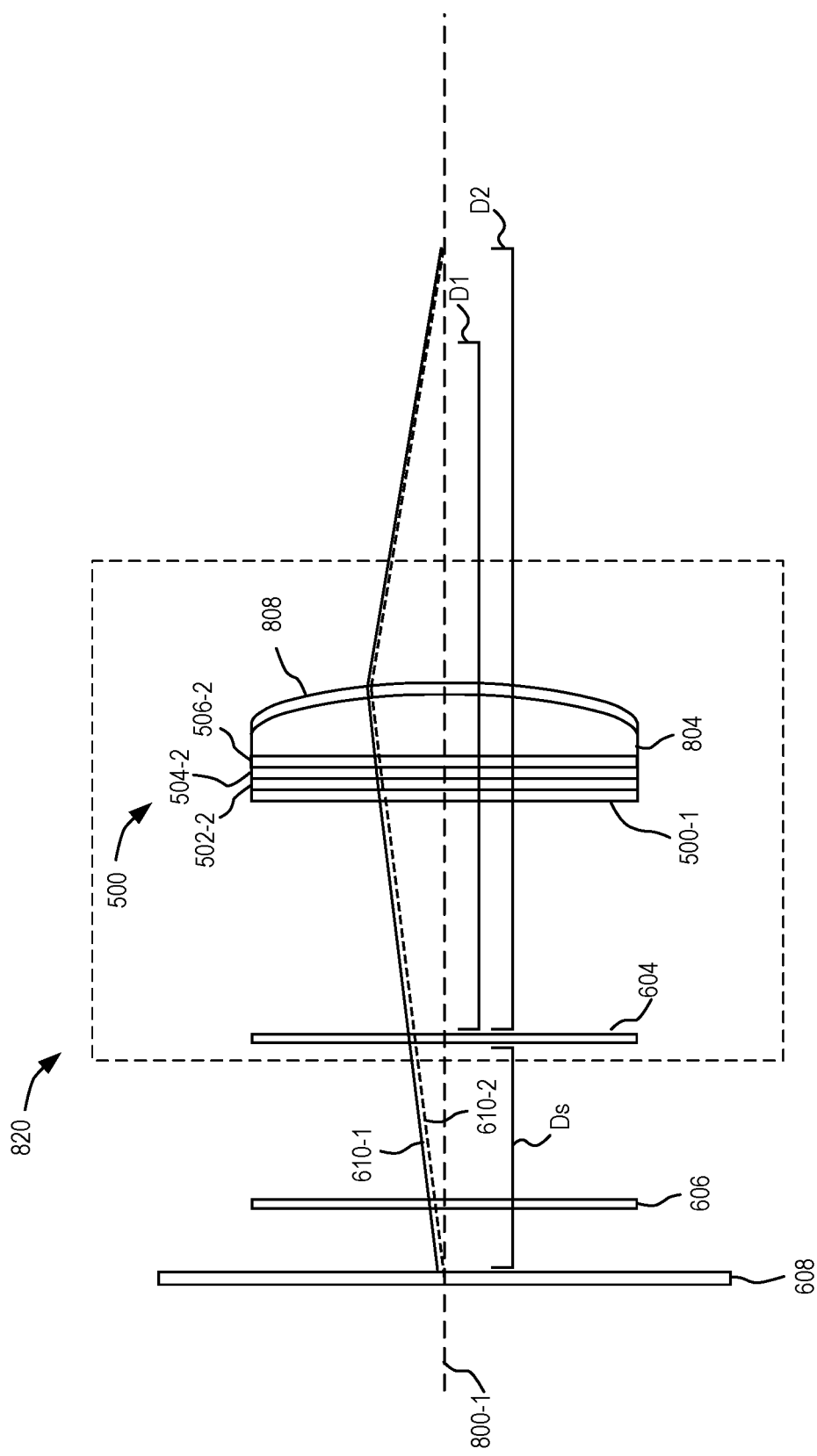

FIGS. 8B and 8C are schematic diagrams illustrating pancake lens 820 in accordance with some embodiments. In some embodiments, pancake lens 820 is similar to pancake lens 800 described with respect to FIG. 8A, except that pancake lens 820 does not include lens 802 and partial reflector 604 has a flat shape. In FIG. 8B, liquid crystal layers 504-2 and 506-2 are in the second state including cholesteric liquid crystals in the linear configuration (e.g., a voltage is applied across liquid crystal layers 504 and 506) and liquid crystal layer 502-1 in the first state including cholesteric liquid crystals in the helical configurations (e.g., no voltage is applied across liquid crystal layer 502). A first portion of light from display 608 (e.g., light 610-1 having a wavelength within a particular wavelength range that liquid crystal layer 502-1 is configured to redirect) propagates along the folded optical path in a manner similar to that described above with respect to FIG. 6. Light 610-1 is thereby focused at distance D1 on optical axis 800-1 from a front surface of pancake lens 820 defined by partial reflector 604. A second portion of light from display 608 (e.g., light 610-2 having a wavelength distinct from the particular wavelength range that liquid crystal layer 502-1 is configured to redirect) propagates through pancake lens 820 directly (without following a folded optical path). Light 610-2 is thereby focused at distance D2 on optical axis 800-1 from the front surface of pancake lens 820 defined by partial reflector 604. As the distance from the display 608 to pancake lens 820 (e.g., to the front surface of pancake lens 820 defined by the partial reflector 604) is known, the focal length F1 for light 610-1 and the focal length F2 for light 610-2 can be determined. For example, when the thickness of pancake lens 820 is small compared to distances Ds, D1, and D2, the focal lengths F1 and F2 can be determined from the thin lens equation:

$$1/Ds + 1/D1 = 1/F1$$

$$1/Ds + 1/D2 = 1/F2$$

Due to the folded optical path, focal length F1 of light 610-1 is shorter than focal length F2 of light 610-2.

FIG. 8C is similar to FIG. 8B except that liquid crystal layer 502-2 is also in the second state including cholesteric liquid crystals in the linear configuration. Thus, the first portion of light from display 608 (e.g., light 610-1 having a wavelength within the particular wavelength range that liquid crystal layer 502-1 is configured to redirect) propagates without following a folded optical path, and is focused at distance D2 on optical axis 800-1 from the front surface of pancake lens 820 defined by partial reflector 604. Thus, by switching liquid crystal layer 502 from the first state to the second state, the pancake lens 820 focuses light 610-1 to different locations.

As described above, pancake lenses of the present disclosure, such as pancake lenses 800 and 820, provide distinct focal lengths for light having distinct wavelength ranges and/or distinct polarizations. For example, a light having a first wavelength may be focused at a first focal length and light having a second wavelength distinct from the first wavelength may be focused at a second focal length distinct from the first focal length. Furthermore, a focal length of a pancake lens for a particular wavelength range can be changed by changing a state of the one or more liquid crystal layers of the polarization selective optical element.

In light of these principles, we now turn to certain embodiments.

In accordance with some embodiments, an optical device includes a light source (e.g., display 608 in FIG. 8A) and a polarization selective optical element (e.g., polarization selective optical element 500). The polarization selective optical element includes a stack of a plurality of cholesteric liquid crystal layers. The plurality of cholesteric liquid crystal layers includes a first cholesteric liquid crystal layer (e.g., liquid crystal layer 502) and a second cholesteric liquid crystal layer (e.g., liquid crystal layer 504). The first cholesteric liquid crystal layer has liquid crystal molecules arranged in a first helical configuration having a first pitch range (e.g., helical configuration 404a having pitch double the half-pitch 406-1) for light of a first wavelength range so that the first cholesteric liquid crystal layer redirects (e.g., reflects) light having the first wavelength range. The second cholesteric liquid crystal layer with liquid crystal molecules arranged in a second helical configuration has a second pitch range (e.g., helical configuration 404a having pitch double the half-pitch 406-2) for light of a second wavelength range so that the second cholesteric liquid crystal layer redirects (e.g., reflects) light having the second wavelength range distinct from the first wavelength range. The second wavelength range is different from the first wavelength range. This structure allows a respective cholesteric liquid crystal layer to: redirect light having a first polarization and a wavelength within a respective wavelength range and transmit light having a second polarization distinct from the first polarization and light having a wavelength outside the respective wavelength range.

In some embodiments, the first pitch range includes a pitch greater than any pitch in the second pitch range.

In some embodiments, the first wavelength range includes a wavelength corresponding to green color and the second wavelength range includes a wavelength corresponding to blue color. The first cholesteric liquid crystal layer (e.g., liquid crystal layer 502 in FIG. 8A) is located at a first distance from the light source (e.g., display 608) and the second cholesteric liquid crystal layer (e.g., liquid crystal layer 504) is located at a second distance greater than the first distance from the light source. In some embodiments, the first cholesteric liquid crystal layer and the second cholesteric liquid crystal layer are positioned relative to each other so that the first cholesteric liquid crystal layer receives incoming light before the second cholesteric liquid crystal layer.

In some embodiments, the plurality of cholesteric liquid crystal layers also includes a third cholesteric liquid crystal layer (e.g., liquid crystal layer 506) with liquid crystal molecules arranged in a third helical configuration having a third pitch range (e.g., helical configuration 404a having pitch double the half-pitch 406-3) for light of a third wavelength range. The third cholesteric liquid crystal layer redirects (e.g., reflects) light having a third wavelength range distinct from the first wavelength range and the second wavelength range. The third wavelength range includes a wavelength corresponding to red color, and the third cholesteric liquid crystal layer is located at a third distance greater than the first distance from the light source (e.g., Green/Red/Blue or Green/Blue/Red). In some embodiments, the third distance is less than the second distance (e.g., Green/Red/Blue). In some embodiments, the third distance is greater than the second distance (e.g., Green/Blue/Red). In some embodiments, the third distance is less than the first distance (e.g., Red/Green/Blue).

In some embodiments, the plurality of cholesteric liquid crystal layers includes four or more cholesteric liquid crystal layers (e.g., four, five, or six cholesteric liquid crystal layers) (e.g., polarization selective optical element 520 in FIG. 5D includes six liquid crystal layers).

In some embodiments, the first helical configuration and the second helical configuration have a same handedness (e.g., liquid crystal layers 502, 504, and 504 include CLCs in helical configurations having the same handedness).

In some embodiments, the first cholesteric liquid crystal layer (e.g., liquid crystal layer 502 in FIG. 8B) is configured to redirect a first portion of received light having a first polarization and within a first wavelength range (e.g., light 610-1) and transmit a second portion of the received light having a second polarization orthogonal to the first polarization or having a wavelength outside the first wavelength range (e.g., light 610-2). The second cholesteric liquid crystal layer is positioned to receive the second portion of the light.

In some embodiments, the first cholesteric liquid crystal layer and the second cholesteric liquid crystal layer have a common geometric axis (e.g., liquid crystal layers 502, 504, and 506 have a common geometric axis 500-1 in FIG. 5A).

In some embodiments, a respective cholesteric liquid crystal layer of the plurality of cholesteric liquid crystal layers is switchable between different states, including a first state and a second state distinct from the first state (e.g., the first state including CLCs in the helical configurations shown in FIG. 4A and the second state including CLCs in the linear configurations shown in FIG. 4B).

In some embodiments, while the respective cholesteric liquid crystal layer is in the first state, the liquid crystal molecules of the respective cholesteric liquid crystal layer are arranged in a helical configuration having a particular handedness and a particular pitch range (e.g., FIG. 4A). While the respective cholesteric liquid crystal layer is in the second state, the liquid crystal molecules of the respective cholesteric liquid crystal layer are arranged in a linear configuration (e.g., FIG. 4B). In some embodiments, a linear configuration refers to a homeotropic configuration. In homeotropic configuration liquid crystals having a rod-like shape align perpendicular to a substrate supporting the respective liquid crystal layer.

In some embodiments, while the respective cholesteric liquid crystal layer is in the first state (e.g., liquid crystal layer 504-1 in FIG. 5C), the respective cholesteric liquid crystal layer redirects the light having the first polarization and within the respective wavelength range (e.g., light 510-1) and transmits the light having the second polarization and the light having the wavelength outside the respective wavelength range (e.g., light 510-2). While the respective cholesteric liquid crystal layer is in the second state (e.g., liquid crystal layer 504-2 in FIG. 5B), the respective cholesteric liquid crystal layer transmits the light having the first polarization and within the respective wavelength range, the light having the second polarization, and the light having the wavelength outside the respective wavelength range (e.g., light 512).

In some embodiments, a respective cholesteric liquid crystal layer in the plurality of cholesteric liquid crystal layers is individually switchable (e.g., FIGS. 5A-5C). For example, the first cholesteric liquid crystal layer may be in the first state or the second state independent of the state the second cholesteric liquid crystal layer is in, and the second cholesteric liquid crystal layer may be in the first state or the second state independent of the state the first cholesteric liquid crystal layer is in.

In some embodiments, the plurality of cholesteric liquid crystal layers are switchable collectively (e.g., the first cholesteric liquid crystal layer and the second cholesteric liquid crystal layer need to be in the first state or the second state together) (e.g., FIGS. 7A and 7B).

In some embodiments, the optical device includes a partial reflector (e.g., partial reflector 604 in FIG. 8A) located between the light source and the polarization selective optical element.

In some embodiments, the optical device includes a first lens positioned between the polarization selective optical element and the partial reflector (e.g., lens 802 in FIG. 8A).

In some embodiments, the optical device includes a second lens (e.g., lens 804 in FIG. 8A) positioned relative to the polarization selective optical element so that the polarization selective optical element is positioned between the second lens and the partial reflector.

In some embodiments, the polarization selective optical element is in contact with a curved surface of the second lens (e.g., the polarization selective optical element may be positioned on the curved surface 804-1 of lens 804 shown in FIG. 8A in a manner analogous to positioning of liquid crystal layer 420 on a curved surface as shown in FIG. 4C).

In some embodiments, the polarization selective optical element is in contact with a flat surface of the second lens (e.g., polarization selective optical element 500 is in contact with a flat surface of lens 804 in FIG. 8A).

In some embodiments, the polarization selective optical element is in contact with the first lens and the second lens (e.g., polarization selective optical element 500 is sandwiched between lens 802 and lens 804 so that there is no air gap between the lenses and the reflective polarizer).

In some embodiments, the polarization selective optical element is positioned to receive first light from the partial reflector. The first light has the first polarization. A respective cholesteric liquid crystal layer is switchable between different states, including a first state and a second state distinct from the first state. While the respective cholesteric liquid crystal layer is in the first state, optical device focuses at least a portion of the first light at a first location having a first distance from the first lens, and while the respective cholesteric liquid crystal layer is in the second state, the optical device focuses at least a portion of the first light at a second location having a second distance distinct from the first distance from the first lens (e.g., FIGS. 8B and 8C). In some cases, the first location corresponds to a first focal point of the first lens and the second location corresponds to a second focal point of the first lens.

In accordance with some embodiments, a method includes receiving light including a first wavelength and a second wavelength (e.g., FIG. 7B). The method also includes transmitting the light through a polarization selective optical element including a stack of a plurality of cholesteric liquid crystal layers. The plurality of cholesteric liquid crystal layers includes a first cholesteric liquid crystal layer with liquid crystal molecules arranged in a first helical configuration having a first pitch range for light of the first wavelength range including the first wavelength and a second cholesteric liquid crystal layer with liquid crystal molecules arranged in a second helical configuration having a second pitch range for light of a second wavelength range that is different from the first wavelength range and including the second wavelength. Transmitting includes transmitting the light through the first cholesteric liquid crystal layer prior to transmitting the light through the second cholesteric liquid crystal layer. In some embodiments, the first wavelength corresponds to a green color and the second wavelength corresponds to a blue color.

In some embodiments, the method includes switching the first cholesteric liquid crystal layer between a first state for redirecting at least a portion of the light and a second state for transmitting the light independent of a state the second cholesteric liquid crystal layer is in (e.g., FIGS. 7A and 7B). The method also includes switching the second cholesteric liquid crystal layer between the first state and the second state independent of the state the first cholesteric liquid crystal layer is in.

In accordance with some embodiments, a polarization selective optical element (e.g., polarization selective optical element 500 in FIG. 5A) includes a stack of a plurality of cholesteric liquid crystal layers. The plurality of cholesteric liquid crystal layers includes a first cholesteric liquid crystal layer with liquid crystal molecules arranged in a first helical configuration having a first pitch range for light of a first wavelength range and a second cholesteric liquid crystal layer with liquid crystal molecules arranged in a second helical configuration having a second pitch range for light of a second wavelength range that is different from the first wavelength range.

In some embodiments, a respective cholesteric liquid crystal layer in the plurality of cholesteric liquid crystal layers is individually switchable (e.g., FIGS. 5B and 5C).

In accordance with some embodiments, an optical device (e.g., FIG. 5E) includes a stack of a plurality of cholesteric liquid crystal layers (e.g., liquid crystal layers 502, 504, and 506). The plurality of cholesteric liquid crystal layers includes a first cholesteric liquid crystal layer with liquid crystal molecules arranged in a first helical configuration having a first pitch range for light of a first wavelength range and a second cholesteric liquid crystal layer with liquid crystal molecules arranged in a second helical configuration having a second pitch range for light of a second wavelength range that is different from the first wavelength range. The optical device also includes a reflective polarizer (e.g., reflective polarizer 532) coupled with the stack of the plurality of cholesteric liquid crystal layers. In some embodiments, the stack of the plurality of cholesteric liquid crystal layers is in contact with the reflective polarizer.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
    a light source;
    a polarization selective optical element including a stack of a plurality of cholesteric liquid crystal layers, the plurality of cholesteric liquid crystal layers including a first cholesteric liquid crystal layer with liquid crystal molecules arranged in a first helical configuration having a first pitch range for light of a first wavelength range and a second cholesteric liquid crystal layer with liquid crystal molecules arranged in a second helical configuration having a second pitch range for light of a second wavelength range that is different from the first wavelength range;

a partial reflector located between the light source and the polarization selective optical element;

a first lens positioned between the polarization selective optical element and the partial reflector; and a second lens positioned relative to the polarization selective optical element so that the polarization selective optical element is positioned between the second lens and the partial reflector.

2. The optical device of claim 1, wherein the first pitch range includes a pitch greater than any pitch in the second pitch range.

3. The optical device of claim 1, wherein the first wavelength range includes a wavelength corresponding to green color and the second wavelength range includes a wavelength corresponding to blue color, and the first cholesteric liquid crystal layer is located at a first distance from the light source and the second cholesteric liquid crystal layer is located at a second distance greater than the first distance from the light source.

4. The optical device of claim 3, wherein the plurality of cholesteric liquid crystal layers also includes a third cholesteric liquid crystal layer with liquid crystal molecules arranged in a third helical configuration having a third pitch range for light of a third wavelength range, the third wavelength range includes a wavelength corresponding to red color, and the third cholesteric liquid crystal layer is located at a third distance greater than the first distance from the light source.

5. The optical device of claim 1, wherein a respective cholesteric liquid crystal layer of the plurality of cholesteric liquid crystal layers is switchable between different states, including a first state that and a second state distinct from the first state.

6. The optical device of claim 5, wherein:

while the respective cholesteric liquid crystal layer is in the first state, the liquid crystal molecules of the respective cholesteric liquid crystal layer are arranged in a helical configuration having a particular handedness and a particular pitch range; and while the respective cholesteric liquid crystal layer is in the second state, the liquid crystal molecules of the respective cholesteric liquid crystal layer are arranged in a linear configuration.

7. The optical device of claim 5, wherein a respective cholesteric liquid crystal layer in the plurality of cholesteric liquid crystal layers is individually switchable.

8. The optical device of claim 1, wherein the plurality of cholesteric liquid crystal layers includes four or more cholesteric liquid crystal layers.

9. The optical device of claim 1, wherein:

the first helical configuration and the second helical configuration have a same handedness.

10. The optical device of claim 1, wherein:

the first cholesteric liquid crystal layer is configured to redirect a first portion of received light having a first polarization and within the first wavelength range and transmit a second portion of the received light having a second polarization orthogonal to the first polarization or having a wavelength outside the first wavelength range; and the second cholesteric liquid crystal layer is positioned to receive the second portion of the light.

11. The optical device of claim 1, wherein the first cholesteric liquid crystal layer and the second cholesteric liquid crystal layer have a common geometric axis.

12. The optical device of claim 1, wherein the polarization selective optical element is in contact with a curved surface of the second lens.

13. The optical device of claim 1, wherein the polarization selective optical element is in contact with a flat surface of the second lens.

14. The optical device of claim 1, wherein the polarization selective optical element is in contact with the first lens and the second lens.

15. The optical device of claim 1, wherein:

the polarization selective optical element is positioned to receive first light from the partial reflector, the first light having a first polarization; and a respective cholesteric liquid crystal layer is switchable between different states, including a first state and a second state distinct from the first state, so that, while the respective cholesteric liquid crystal layer is in the first state, the optical device focuses at least a portion of the first light at a first location having a first distance from the first lens, and while the respective cholesteric liquid crystal layer is in the second state, the optical device focuses at least a portion of the first light at a second location having a second distance distinct from the first distance from the first lens.

16. A method, comprising:

receiving light including a first wavelength and a second wavelength from the light source of the optical device of claim 1; and transmitting the light through the polarization selective optical element of the optical device, the polarization selective optical element including a stack of a plurality of cholesteric liquid crystal layers, the plurality of cholesteric liquid crystal layers including a first cholesteric liquid crystal layer with liquid crystal molecules arranged in a first helical configuration having a first pitch range for light of a first wavelength range including the first wavelength and a second cholesteric liquid crystal layer with liquid crystal molecules arranged in a second helical configuration having a second pitch range for light of a second wavelength range that is different from the first wavelength range and including the second wavelength, including transmitting the light through the first cholesteric liquid crystal layer prior to transmitting the light through the second cholesteric liquid crystal layer.

17. The method of claim 16, further comprising:

switching the first cholesteric liquid crystal layer between a first state for redirecting at least a portion of the light and a second state for transmitting the light independent of a state the second cholesteric liquid crystal layer is in; and switching the second cholesteric liquid crystal layer between the first state and the second state independent of the state the first cholesteric liquid crystal layer is in.

18. The optical device of claim 1, wherein the second lens is positioned to receive light transmitted through the polarization selective optical element directly from the polarization selective optical element.

\* \* \* \* \*